(12) United States Patent
Nibarger

(10) Patent No.: US 6,969,021 B1
(45) Date of Patent: Nov. 29, 2005

(54) VARIABLE CURVATURE IN TAPE GUIDE ROLLERS

(75) Inventor: John P. Nibarger, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/780,032

(22) Filed: Feb. 17, 2004

(51) Int. Cl.⁷ .............................................. G11B 23/04
(52) U.S. Cl. ................. 242/346.2; 242/615.2
(58) Field of Search .............................. 242/346, 346.2, 242/615.2; 360/130.21, 132; 226/189, 194

(56) References Cited

U.S. PATENT DOCUMENTS

| | | | | |
|---|---|---|---|---|
| 2,501,407 A | * | 3/1950 | Olsen et al. | 242/615.2 |
| 2,618,465 A | * | 11/1952 | Austin, Jr. | 242/615.2 |
| 3,143,270 A | * | 8/1964 | Cohen | 242/615.2 |
| 3,642,229 A | * | 2/1972 | Downey et al. | 242/615.2 |
| 3,889,900 A | * | 6/1975 | Nelson | 242/346 |
| 4,114,751 A | * | 9/1978 | Nordin | 242/615.2 |
| 4,170,175 A | * | 10/1979 | Conlon, Jr. | 242/615.2 |
| 4,335,857 A | * | 6/1982 | Pfost et al. | 242/346.2 |
| 4,607,806 A | * | 8/1986 | Yealy | 242/236.2 |
| 5,992,827 A | * | 11/1999 | Kvalsund | 242/615.2 |
| 6,116,535 A | * | 9/2000 | Selg et al. | 242/615.2 |
| 6,320,727 B1 | * | 11/2001 | Cope et al. | 360/130.21 |

FOREIGN PATENT DOCUMENTS

| | | | |
|---|---|---|---|
| JP | 59-190153 | * | 10/1984 |
| JP | 4-64953 | * | 2/1992 |
| JP | 4-135010 | * | 5/1992 |

* cited by examiner

*Primary Examiner*—William A. Rivera
(74) *Attorney, Agent, or Firm*—Yee & Associates, P.C.

(57) ABSTRACT

An apparatus is provided for reducing tape media edge damage in data regions and controlling the position of the tape media in a passive manner. A curved tape guide surface of a tape guide roller controls tape media edge damage by restoring the tape media to a properly aligned position on a tape guide roller by using tape guide rollers with curved edge stops that exert a force to the tape media during a lateral shift. As the tape moves around the roller, the restoring force exerted by the curved portion of the tape guide roller on the tape during any lateral shift restores the tape to a centered position. Keeping the tape media in a centered position reduces tape edge wear, lessens degradation of the integrity of the tape and increases the useful lifetime of the tape.

20 Claims, 4 Drawing Sheets

VARIABLE CURVATURE IN TAPE GUIDE ROLLERS

RELATED APPLICATIONS

The present invention is related to commonly assigned and co-pending U.S. patent application Ser. No. 10/746,383, entitled "REDUCING TAPE MEDIA DAMAGE IN DATA REGIONS", filed on Dec. 26, 2003 and hereby incorporated by reference.

BACKGROUND OF THE INVENTION

1. Field of the Invention

The present invention relates generally to mitigating tape media damage. More particularly, the present invention relates to an apparatus for restoring tape media to the center of a tape guide roller.

2. Background of the Invention

Magnetic tape media, including reel and cassette-style cartridges and other devices that use magnetic media, are used in many industries to store data, programs, and other information. Magnetic tape media is typically stored on reels or spools, which are cylinders about which the tape media is wound, typically having flanges to guide the tape media onto the cylinder. The spools may be housed in a cassette or cartridge to protect the tape and increase the ease of handling. Accessing information from a reel or spool of tape media typically requires that the spool be inserted into a reading machine, which unwinds the tape media from the file spool, through a plurality of tape guide rollers and a read/write head and winds it onto a temporary storage spool (also referred to as a machine reel or machine spool) until the portion of the tape media with the desired information is reached. The temporary storage spool may either be external to the cassette (single reel) or integrated into the cassette (double reel). A magnetic read element reads the information, and, for the single reel cassette, the tape media is rewound back onto the original file spool and removed from the reader. For the double reel cassette, the tape is often parked halfway between the ends of the tape before being removed.

On a typical machine that is reading magnetic tape media, the tape guide rollers that control the tape media path have hard stops on each side of the roller. The spacing between the hard stops of the tape guide rollers is wider than the nominal width of the tape media. As the tape media is fed onto these tape guide rollers with hard stops, lateral tape media motion may occur during a start or stop operation, and edge damage may result. If the edge damage is severe, track following capability may be lost and the head to tape media spacing may increase to the point where data cannot be read back. In the most severe case the tape can break, leading to catastrophic failure.

As the thickness of tape media continues to get thinner, the tape media will be more prone to edge damage. A solution to lessen tape media damage would be to eliminate the occurrence of the tape media wearing against the hard stops of the tape guide roller. One such technique includes using tape guide rollers that are continuously curved and exerts a force to the tape media during a lateral shift, which returns the tape media to a properly aligned position, thereby minimizing the potential for tape media edge damage. However, due to the continuously curved roller, the tape media is under constant tension or compression, which can lead to edge damage.

Thus, it would be advantageous to have an apparatus for controlling the position of a magnetic tape media within a reading machine to mitigate tape media edge damage.

SUMMARY OF THE INVENTION

The present invention recognizes the disadvantages of the prior art and provides an apparatus for reducing tape media edge damage in data regions and controlling the position of the tape media in a passive manner. The apparatus of the present invention controls where edge damage may occur by returning the tape media to a properly aligned position by using tape guide rollers with curved edge stops that exert a force to the tape media during a lateral shift.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
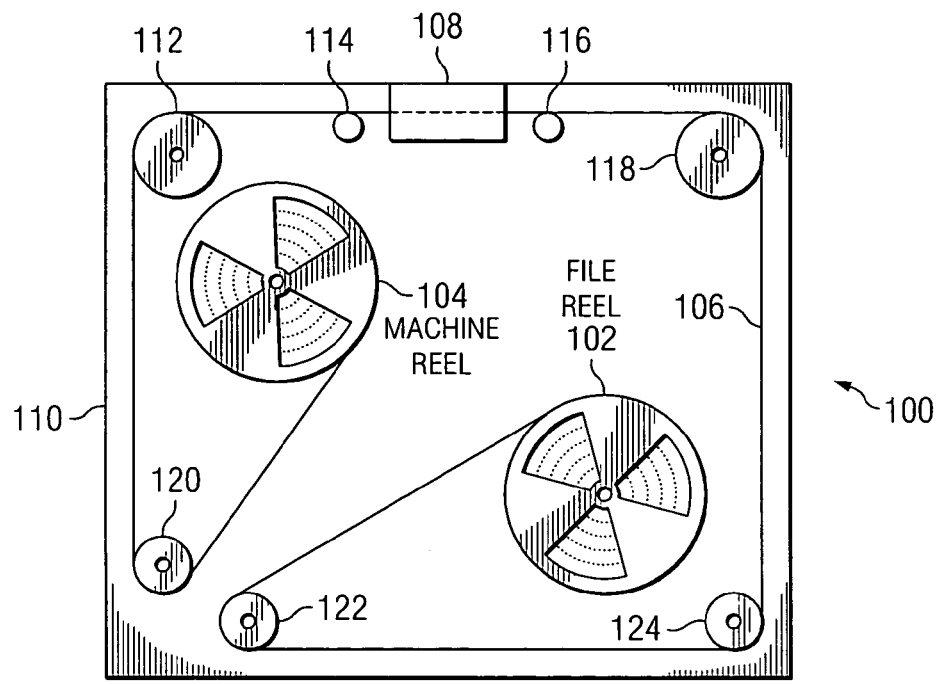
FIG. 1 is a top view of a double reel tape cartridge in accordance with a preferred embodiment of the present invention.

With reference now to FIG. 1, a top view of a tape cartridge is depicted in accordance with the present invention. Tape cartridge 100 includes file reel 102 for supplying tape media to machine reel 104. File reel 102 is also referred to as a supply reel. Machine reel 104 is also referred to as a take-up reel. Tape media 106 travels in a tape media path between file reel 102 and machine reel 104. Alternatively, multiple read/write heads 108 may be used for reading and writing data to tape media 106.

In this example, a plurality of tape guide rollers 112, 114, 116, 118, and 124 are provided for guiding tape media 106 through the tape media path, although any number of tape guide rollers may be used in the tape cartridge. Each tape guide roller 112, 114, 116, 118, and 124 has a hollow core (not shown), which slides over a roller guide on the tape cartridge. The tape guide rollers may be flanged or unflanged, spinning or stationary, contoured or not contoured. Tape guide rollers 112, 114, 116, 118, and 124 limit lateral tape media motion, skew, and cross-web tension.

Post guides 120 and 122 may also be used to extend the total length of the tape media path. The inclusion of post guides 120 and 122 in tape cartridge 100 permits tape guide rollers 112, 114, 116, 118, and 124 to be moved as far as possible from file reel 102 and machine reel 104. Any known guides may be used to implement post guides 120 and 122. Post guides 120 and 122 may be flanged or unflanged, spinning or stationary, contoured or not contoured.

Tape cartridge 100 is typically housed within a housing in a storage device. The housing, such as housing 110, is a finite size and a particular shape as determined by marketing requirements. The size and shape of the housing limits the placement of the various rollers, guides, heads, and reels of the tape mechanism.

Edge damage may occur in file reel 102 and machine reel 104. Edge damage may occur when the tape drive performs a start or stop operation. When the tape media is started again or is stopped, the tape media may experience some lateral motion as the tape media is brought up to speed or when the tape media is stopped. On a typical spool holding the magnetic tape media, the spacing between the upper and lower flexible flanges of the spools (both the file spool and the machine spool) is wider than the nominal width of the tape media. As the tape media is fed onto these spools, the tape media may move in a perpendicular to normal tape media motion during a start or stop operation, resulting in edge damage. This perpendicular movement is referred to as lateral tape motion. Tape media edge damage may be caused when the flexible flange is forced against the tape media during shipment or rough handling, since the edge of tape media is standing out from the tape pack. Tape media edge damage may also occur on the various rollers and guides such as tape guide rollers 112, 114, 116, 118, 120, 122, and 124. Tape damage occurs when these rollers and guides use a hard stop on either one or both ends. As the edge of the tape media is in contact with the hard stop, the edge may undergo damage from scraping along the edge. If the edge damage is severe, track following capability may be lost and the head to tape spacing may increase to the point where data cannot be read back.

Figure 2:
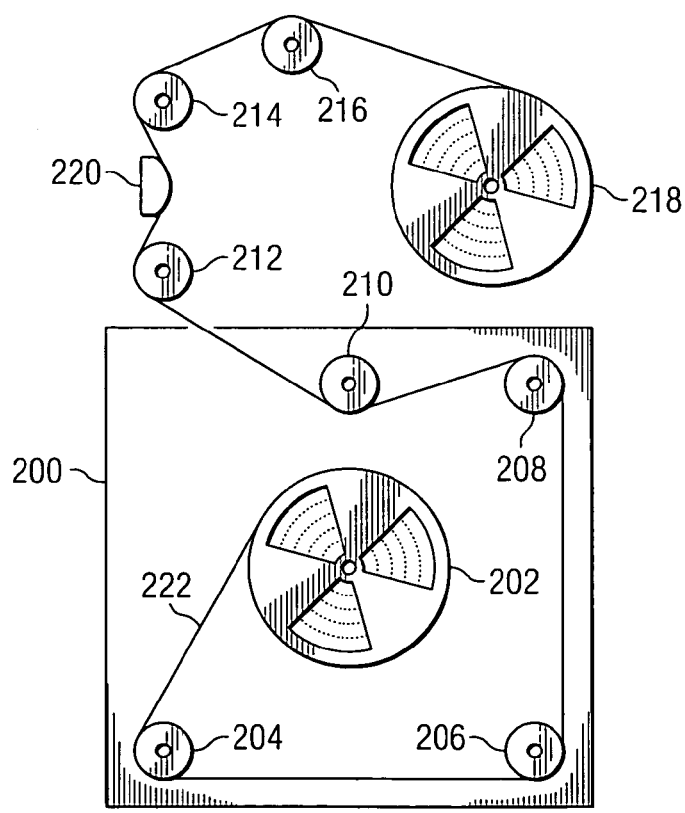
FIG. 2 is a top view of a single reel tape cartridge in accordance with a preferred embodiment of the present invention.

The present invention may also be used with single reel cartridges, such as cartridge 200 as shown in FIG. 2. FIG. 2 illustrates a top view of a single reel tape cartridge in accordance with the present invention. Tape cartridge 200 includes file reel 202 for supplying tape media to a machine reel 218 located external to cartridge 200. Tape guide rollers 204, 206, 208 and 210 guide the tape onto and off of file reel 202. Tape guide rollers 212, 214 and 216 control the tape past the reader/writer 220 and onto the machine reel 218. Tape damage may occur in file reel 202 and machine reel 218 if the tape were to wear against the sides of the reels. Tape damage may also occur on tape guide rollers 204, 206, 208, 210, 212, 214, and 216 as tape media 222 travels in a tape media path between file reel 202 around tape guide rollers 204, 206, 208, 210, 212, 214, and 216 to machine reel 218.

Figure 3:
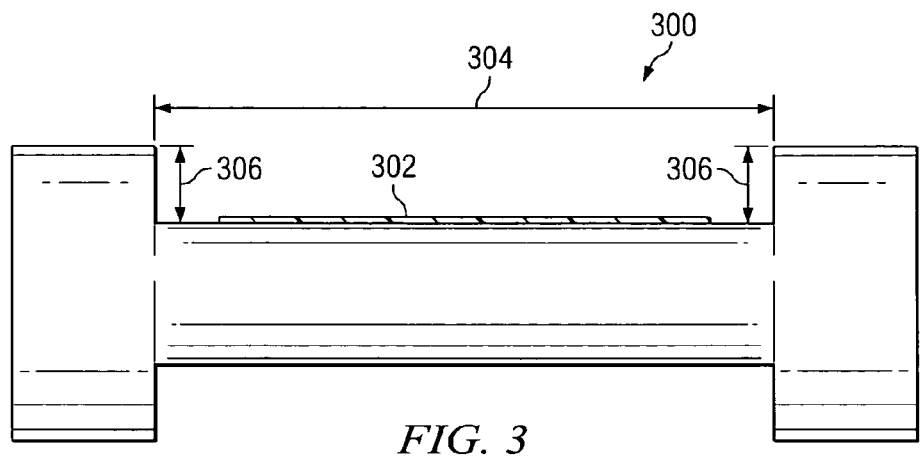
FIG. 3 is a cross-sectional view of a known tape guide roller that uses hard stops to control the tape path.

FIG. 3 is a cross-sectional view of a known tape guide roller that uses hard stops to control the tape media path. Tape media 302 travels across tape guide roller 300 in an area of substantially zero curvature 304. During times when tape media 302 experiences lateral shift, the tape media 302 wears against hard stops 306, which prevents the tape media 302 from moving off the roller. However, there is no correction added to the tape media 302 to restore it to an optimal position, thus increasing the risk of edge damage as the tape wears against hard stops 306.

The present invention provides a method for preserving data integrity by reducing tape media edge damage in the tape data regions. Tape media is typically wound on one or two reels and around a plurality of tape guide rollers in a protective housing, such as a cassette or cartridge. Tape guide rollers act as guides for the tape media as the tape media winds to and from the reels and through read/write heads of a tape cartridge. As the tape media moves across the tape guide rollers, hard stops are provided at the edge of the tape guide rollers so that the tape media does not move off the tape guide roller. Tape media edge damage may be caused when the tape media wears against the hard stops. The present invention controls the tape media path as it moves with respect to the tape guide roller, such that the tape media is guided to a center portion of the tape guide roller, thus reducing tape media edge wear, preserving the integrity of the tape media and increasing the useful lifetime of the tape media.

Figure 4:
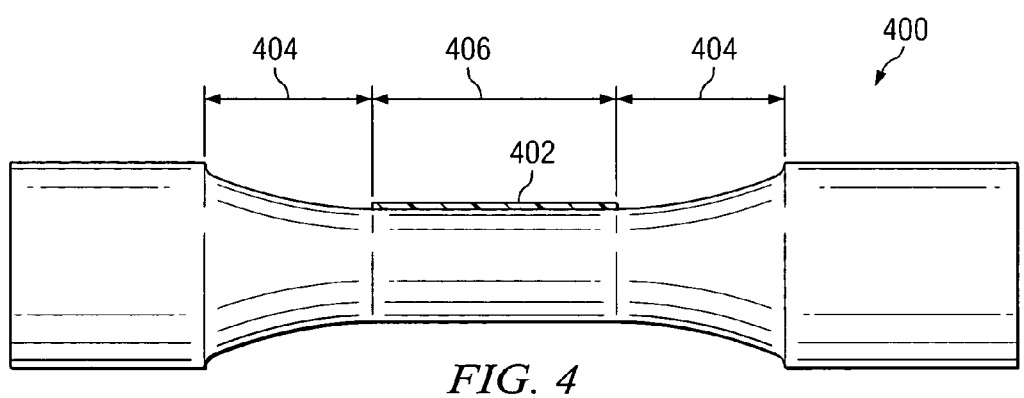
FIG. 4 is a cross-sectional view of a tape guide roller showing the tape centered and experiencing substantially zero restoring force in accordance with a preferred embodiment of the present invention.

Turning next to FIG. 4, a diagram of a cross-sectional view of a tape guide roller showing the tape centered and experiencing substantially zero restoring force is depicted in accordance with a preferred embodiment of the present invention. Tape guide roller 400 is shown having equal areas of positive curvature 404, and an area of substantially zero curvature 406. Tape media 402 travels across tape guide roller 400 in an optimal position being in the area of substantially zero curvature 406. As the tape travels across tape guide roller 400 in this optimal position the tape media 402 will experience substantially zero restoring force from the areas of positive curvature 404. The restoring force experienced by the tape media is related to the mechanical properties of the media. As tape media 402 moves laterally into an area of positive curvature 404, the tape media 402 must stretch if it is to stay in contact with tape guide roller 400. This elongation generates a strain in the tape media 402 and creates a restoring force to return the media to its original shape. This restoring force is proportional to the wrap angle of the tape media 402 around the tape guide roller 400. The larger the wrap angle, the larger the restoring force.

Figure 5:
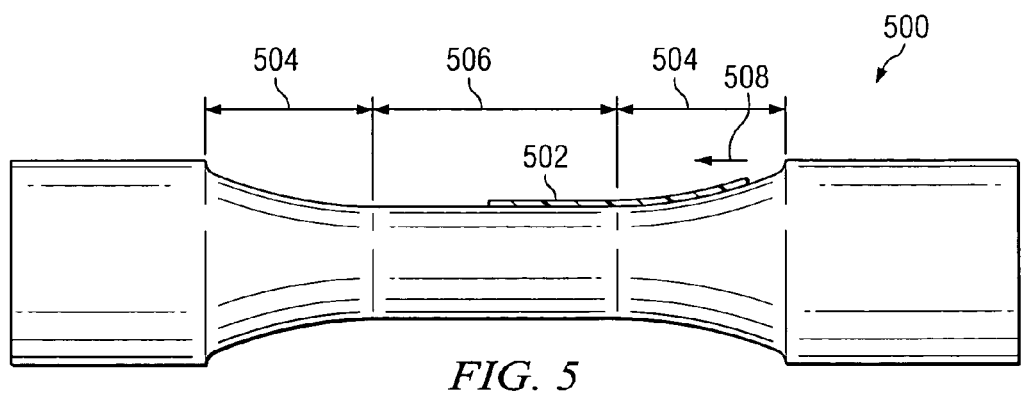
FIG. 5 is a cross-sectional view of a tape guide roller showing the tape offset and experiencing a restoring force in accordance with a preferred embodiment of the present invention.

Turning now to FIG. 5, a diagram of a cross-sectional view of a tape guide roller showing the tape offset and experiencing a restoring force is depicted in accordance with a preferred embodiment of the present invention. Tape guide roller 500 is shown having equal areas of positive curvature 504 and an area of substantially zero curvature 506. As an example, as the tape media 502 travels across tape guide roller 500 and experiences lateral shift, the tape media 502 enters an area of positive curvature 504. As the tape media 502 moves further up the positively curved portion of the tape guide roller 500, the slope increases which increases the restoring force 508 applied to the tape media 502. This restoring force 508 is exerted on the tape media 502 to restore the tape media 502 to an optimal position in the area of substantially zero curvature 506. The restoring force 508 exerted on the tape media 502 as it moves into an area of positive curvature 504 arises from both the increased stress due to the curvature in the tape guide roller 500 as well as the wrap angle of the tape media on the roller.

Figure 6:
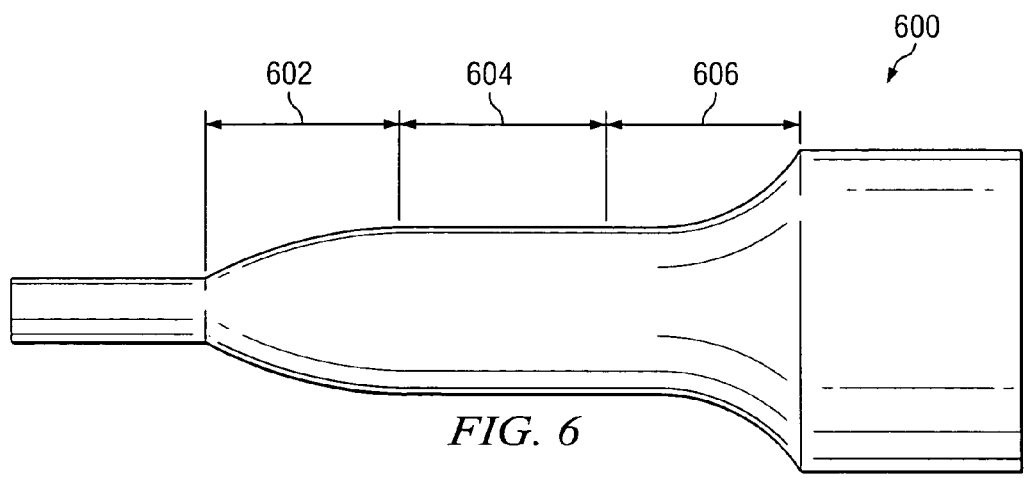
FIG. 6 is a cross-sectional view of a tape guide roller showing varying amounts of possible curvatures in accordance with a preferred embodiment of the present invention.

FIG. 6 is a cross-sectional view of a tape guide roller showing varying amounts of possible curvatures in accordance with a preferred embodiment of the present invention. Tape guide roller 600 is shown having an area of negative curvature 602, an area of substantially zero curvature 604, and an area of positive curvature 606. When the tape media travels across the tape guide roller 600 in the area of substantially zero curvature 604, substantially zero restoring force is present. When the tape media travels across the tape guide roller 600 in the area of positive curvature 606, a restoring force is present to move the tape media back to the area of substantially zero curvature 604. However, when the tape media moves onto the area of negative curvature 602, a negative restoring force will move the tape farther from the area of substantially zero curvature 604. This negative restoring force may be used to control the motion of the tape; however, if the tape media moves too far away from the area of substantially zero curvature 604, then the tape might come off tape guide roller 600 altogether. In accordance with the preferred embodiment of the present invention the tape guide roller has a tape guide surface with cylindrical symmetry. The cylindrical symmetry may be defined by a function, which may be one of a linear function and/or a nonlinear function. Various functions may be considered in creating the curvature of the tape guide surface. Possible functions may include without limitation exponential, brachistochrone, quadratic, cubic, or higher order simple polynomials.

Figure 7A:
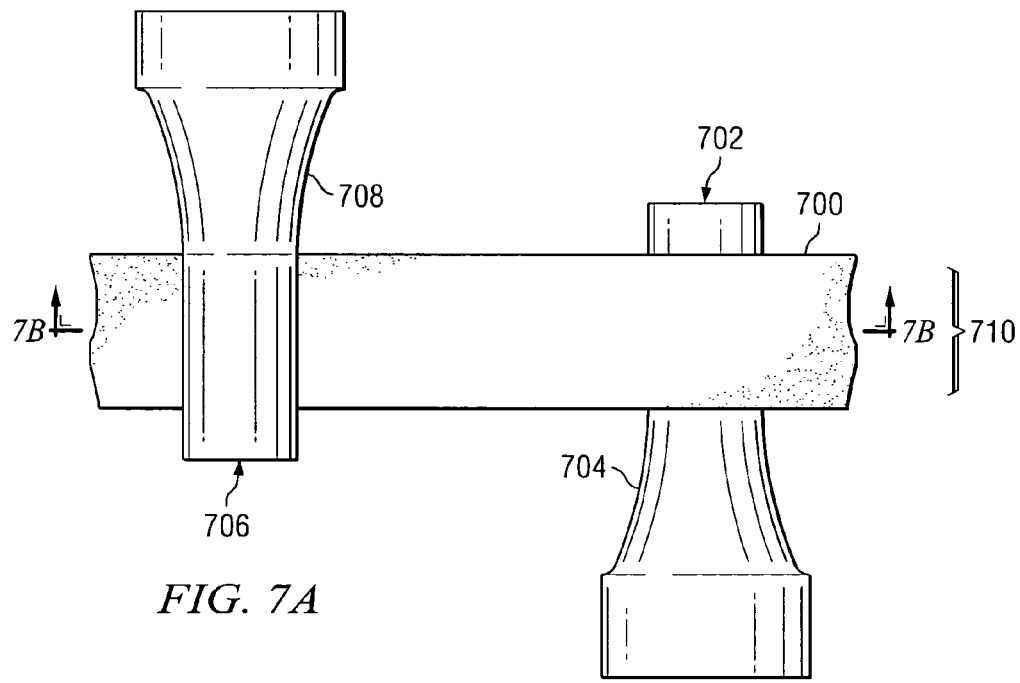
FIGS. 7A and 7B depict another embodiment of the present invention in which two tape guide rollers may be used in opposition to one another to control the path of the tape media.
Figure 7B:
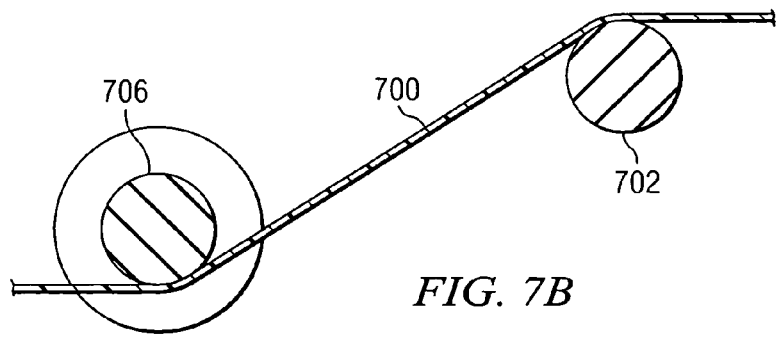

In an alternate embodiment of the present invention, two tape guide rollers may be used in opposition to one another to minimize the tension waves that might arise from increased compression of the tape media as shown in a top view of FIG. 7A. The tape media 700 may be threaded between two tape guide rollers where the curvature can be in opposition as with tape guide rollers 702 and 706. In this embodiment, if tape media 700 were to experience a lateral shift into the area of positive curvature 704, tape guide roller 706 would provide the restoring force necessary to move the tape back to an area of substantially zero curvature 710. If an alternate lateral shift were to occur, moving tape media 700 into the area of positive curvature 708, then tape guide roller 706 would provide the restoring force necessary to move the tape back to an area of substantially zero curvature 710. FIG. 7B provides a side view of the alternate embodiment of FIG. 7A.

Figure 8A:
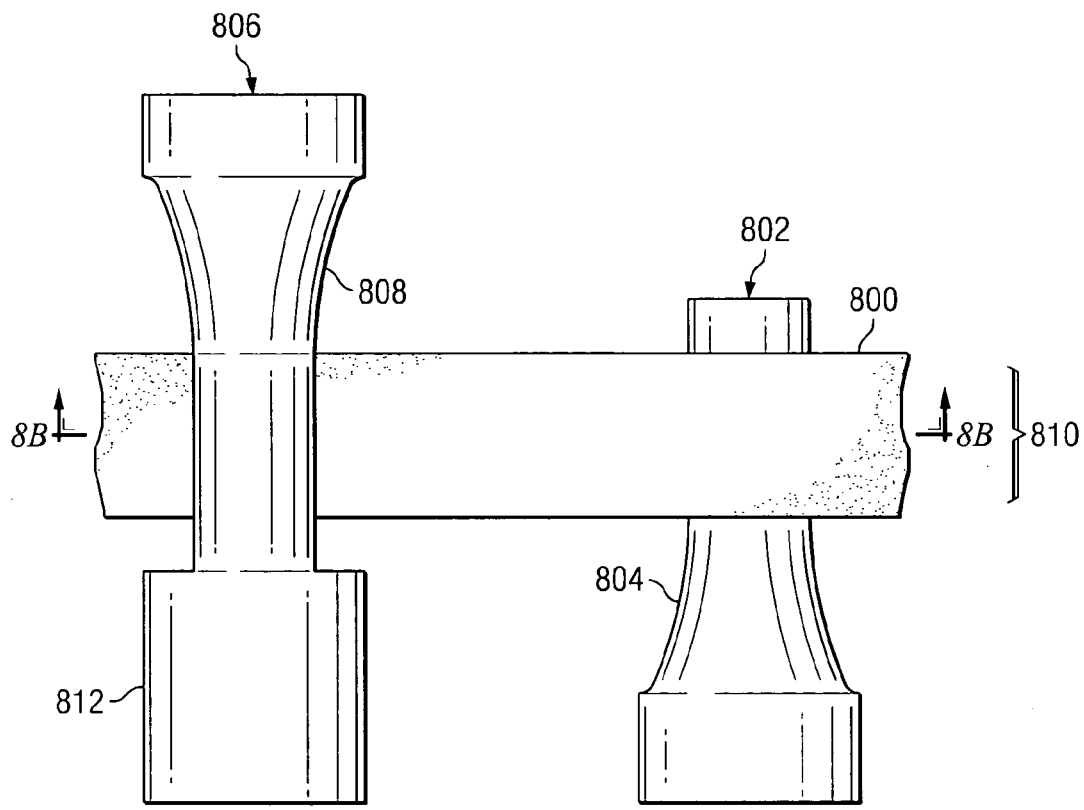
FIGS. 8A and 8B depict another embodiment of the present invention in which two tape guide rollers may be used in opposition to one another to control the path of the tape media, with one tape guide roller taking advantage of a hard stop.
Figure 8B:
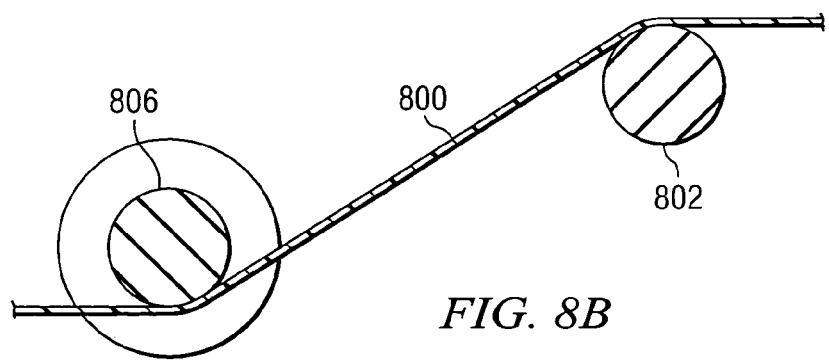

In still another alternate embodiment of the present invention, two tape guide rollers may be used in opposition to one another to minimize the tension waves that might arise from increased compression of the tape media with one tape guide roller taking advantage of a hard stop, as shown in FIG. 8A. The tape media 800 can be threaded between two tape guide rollers where the curvature can be in opposition as with tape guide rollers 802 and 806. In this embodiment, if tape media 800 were to experience a lateral shift into the area of positive curvature 804, tape guide roller 806 would provide the restoring force necessary to move the tape back to an area of substantially zero curvature 810. In addition, if the lateral shift experienced by tape media 800 was an extreme shift, then hard stop 812 would prevent tape media 800 from experiencing and further lateral shift. If an alternate lateral shift were to occur, moving tape media 800 into the area of positive curvature 808, then tape guide roller 806 would provide the restoring force necessary to move the tape back to an area of substantially zero curvature 810. FIG. 8B provides a side view of the alternate embodiment of FIG. 8A.

Thus, the present invention solves the problems associated with the prior art by providing an apparatus for reducing tape media edge damage. The apparatus of the present invention reduces tape media edge damage on tape media by restoring the tape media to an optimal position on the tape guide roller, which is aligned with the read/write head, machine reel, and/or file reel. Although tape media edge damage may occur, the present invention controls the position of the tape media, such that tape media edge damage is reduced, degradation to tape media integrity is reduced and useful lifetime of the tape media is expanded. As a result, data integrity may be preserved. In addition, the rollers act to control the tape media path in a passive manner by returning the media to the substantially zero curvature part of the tape guide roller.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape guide roller for maintaining a position of tape media, the tape guide roller comprising:
   a first portion of a tape guide surface that has a first curvature;
   a second portion of the tape guide surface that has substantially zero curvature; and
   a third portion of the tape guide surface that has a second curvature, wherein the second portion is positioned between the first portion and the third portion and wherein the first curvature and the third curvature provide a restoring force to the tape media to move the tape media to an optimal position substantially centered over the second portion.

2. The tape guide roller according to claim 1, further comprising:
   at least one hard stop portion on at least one end of the tape guide surface.

3. The tape guide roller according to claim 2, wherein the at least one hard stop is at an elevation higher than the tape guide surface.

4. The tape guide roller according to claim 1, wherein the tape guide surface has a surface with cylindrical symmetry.

5. The tape guide roller according to claim 4, wherein the cylindrical symmetry of the tape guide surface has a curvature defined by a function and wherein the function is a linear function or a nonlinear function.

6. The tape guide roller according to claim 5, wherein the function is one of an exponential, brachistochrone, quadratic polynomial, cubic polynomial, or higher order polynomial.

7. The tape guide roller according to claim 1, wherein the tape guide surface has a positive curvature.

8. The tape guide roller according to claim 1, wherein the tape guide surface has a negative curvature.

9. The tape guide roller according to claim 1, wherein the tape guide roller is one of flanged, unflanged, spinning, stationary, contoured or not contoured.

10. A tape feeding mechanism for maintaining the position of tape media, the tape feeding mechanism comprising:
    at least one tape reel;
    a read/write head;

a first portion of a tape guide surface that has a first curvature;

a second portion of the tape aide surface that has substantially zero curvature; and a third portion of the tape guide surface that has a second curvature, wherein the second portion is positioned between the first portion and the third portion and wherein the first curvature and the third curvature provide a restoring force to the tape media to move the tape media to an optimal position substantially centered over the second portion.

11. The tape guide roller according to claim 10, further comprising:

at least one hard stop portion on at least one end of the tape guide surface.

12. The tape guide roller according to claim 11, wherein the at least one hard stop is at an elevation higher than the tape guide surface.

13. The tape guide roller according to claim 10, wherein the tape guide surface has a surface with cylindrical symmetry.

14. The tape guide roller according to claim 13, wherein the cylindrical symmetry of the tape guide surface has a curvature defined by a function and wherein the function is a linear function or a nonlinear function.

15. The tape guide roller according to claim 14, wherein the function is one of an exponential, brachistochrone, quadratic polynomial, cubic polynomial, or higher order polynomial.

16. The tape guide roller according to claim 10, wherein the tape guide surface has a positive curvature.

17. The tape guide roller according to claim 10, wherein the tape guide surface has a negative curvature.

18. The tape guide roller according to claim 10, wherein the tape guide roller is one of flanged, unflanged, spinning, stationary, contoured or not contoured.

19. A tape feeding mechanism for maintaining the position of tape media, the tape feeding mechanism comprising:

at least one tape reel;

a read/write head;

a first tape guide roller; and a second tape guide roller, wherein the first tape guide roller and the second tape guide roller include:

a first portion of a tape guide surface that has a positive curvature;

a second portion of the tape guide surface that has substantially zero curvature;

a third portion of the tape guide surface that has a negative curvature, wherein the second portion is positioned between the first portion and the third portion, wherein the first tape guide roller is positioned in opposition to the second tape guide roller such that the first tape guide roller and the second tape guide roller provide an opposing restoring force to the tape media to move the tape media to an optimal position substantially centered over the second portion of both the first tape guide roller and the second tape guide roller.

20. The set of tape guide rollers according to claim 19, further comprising:

at least one hard stop portion on at least one end of the tape guide surface.

* * * * *